H. DREWELL.
LINE CASTING MACHINE.
APPLICATION FILED MAY 9, 1911.

1,034,089.

Patented July 30, 1912.
3 SHEETS—SHEET 1.

H. DREWELL.
LINE CASTING MACHINE.
APPLICATION FILED MAY 9, 1911.

1,034,089.

Patented July 30, 1912.
3 SHEETS—SHEET 2.

H. DREWELL.
LINE CASTING MACHINE.
APPLICATION FILED MAY 9, 1911.

1,034,089.

Patented July 30, 1912.
3 SHEETS—SHEET 3.

WITNESSES:
John C. Sanders
Leon Spring

INVENTOR:
Heinrich Drewell
BY
ATT'Y.

UNITED STATES PATENT OFFICE.

HEINRICH DREWELL, OF CHARLOTTENBURG, GERMANY, ASSIGNOR TO SCHNELL-SETZMASCHINENGESELLSCHAFT MIT BESCHRÄNKTER HAFTUNG, OF CHARLOTTENBURG, GERMANY.

LINE-CASTING MACHINE.

1,034,089.      Specification of Letters Patent.      Patented July 30, 1912.

Application filed May 9, 1911. Serial No. 625,961.

*To all whom it may concern:*

Be it known that I, HEINRICH DREWELL, subject of the German Emperor, residing at Charlottenburg, Germany, have invented new and useful Improvements in Line-Casting Machines, of which the following is a specification.

My invention relates to a trimming device for matrix-setting and line-casting machines, in which, in contradistinction to known devices, a part is arranged freely movable and automatically adjusts itself corresponding to the thickness of the body of the line.

According to the invention, for removing the bur from the line I do not employ one simple blade or knife, but plates, provided with teeth like those of a milling-tool or a file, pressed under the action of suitable springs or weights against the line. Owing to the shape of the teeth they do not enter into the compact body of the line, but remove only the bur at its edges. In practice, the blades or knives are pressed against the body of the line by the one plate being arranged stationary, and the other displaceable parallel to the former on a readily movable slide. Suitable springs acting on the movable plate press this against the body of the line located between two plates and the line is pressed against the other plate and made uniformly smooth on both sides. The line is preferably introduced between the two plates in known manner by means of an ejector which conveys the line out of the mold into the galley.

One illustrative embodiment of my invention adapted for employment in matrix-setting and line-casting machines of the Mergenthaler type is represented by way of example in the accompanying drawings. It is to be understood however, that my invention can be used, without material alteration, for other line-casting machines.

Figure 1:
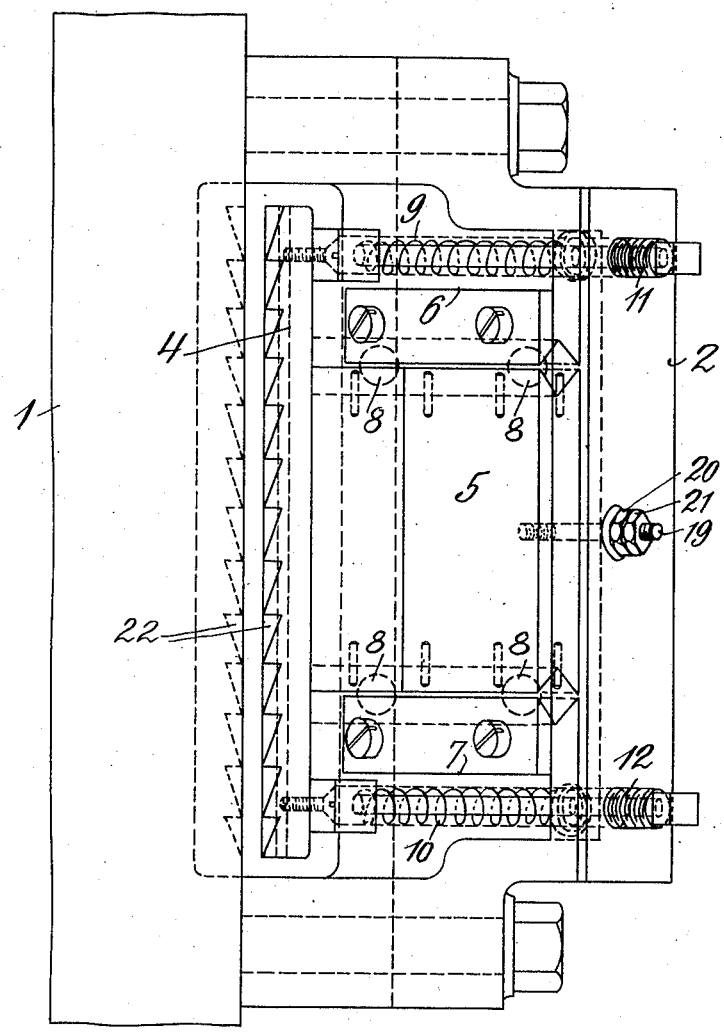
Figure 2:
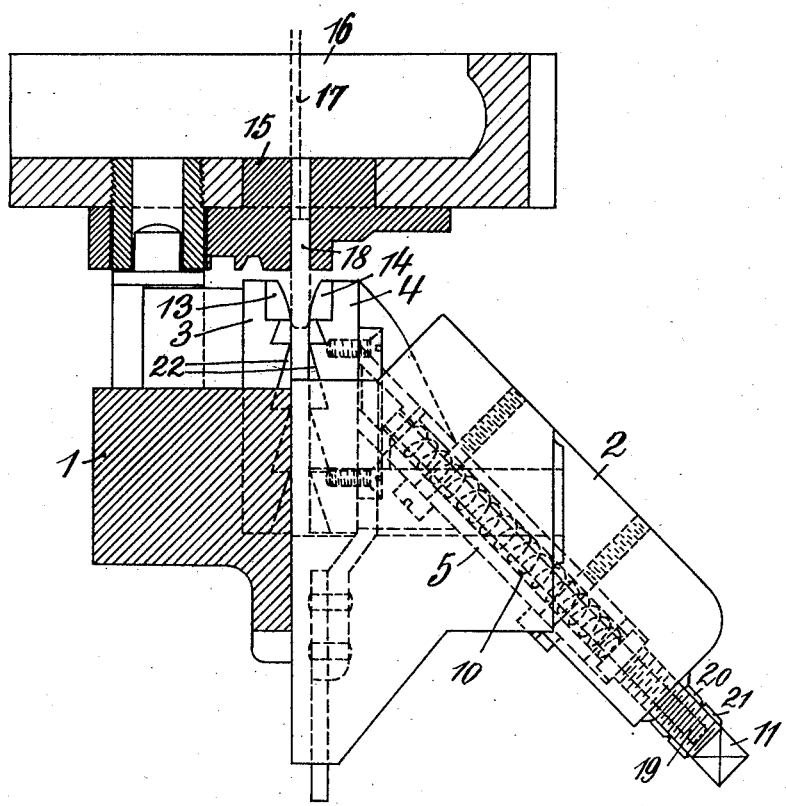
Figure 3:
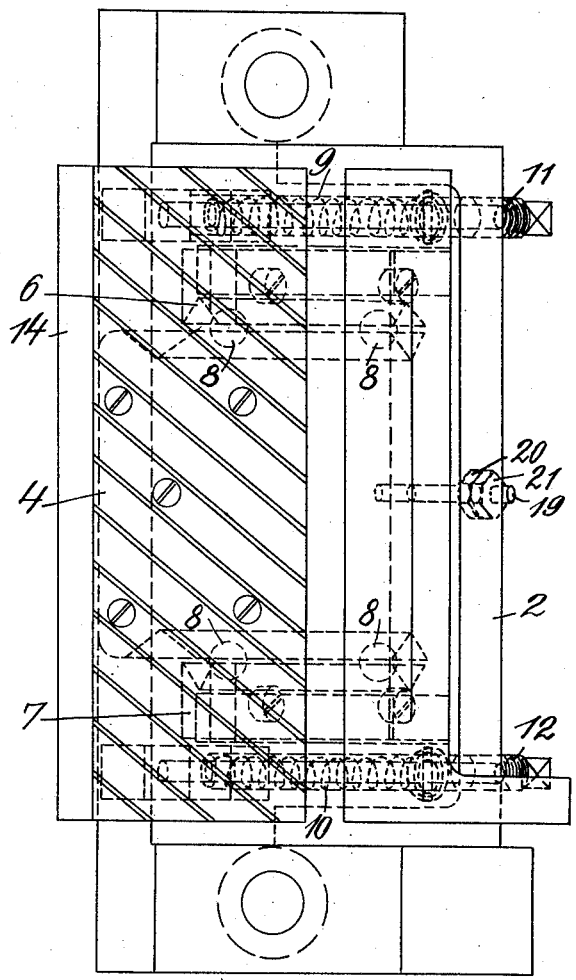

In said drawings:—Figure 1 shows the trimming device in elevation as seen from the front of the machine; Fig. 2 is a top plan view, partly in section, and Fig. 3 is a side elevation showing the movable trimming tool.

Referring to the drawing, the trimming device is attached in known manner to the frame 1 of the machine, the one trimming tool 3 being attached directly thereto, and the other, 4, by means of a slide 5 movable on a holder 2. The two trimming tools 3 and 4 are provided on the side facing the body of the line with slanting teeth 22 which act on the body 18 of the line in the manner of a file or a milling-tool. In order that these teeth shall not be able to penetrate into the body of the line but to remove only the bur produced when molding the teeth may be formed in a suitable manner.

The above-mentioned slide 5 is guided by means of balls 8 between two guides 6 and 7. Above and below the latter I provide pressure springs 9 and 10 which press the tool 4 against the line with a pressure which can be exactly regulated by screws 11 and 12. In consequence of balls being employed, as mentioned above, the slide is readily movable, so that the action of the springs 9 and 10 cannot be irregularly influenced by frictional resistances.

At the place where the body 18 of the line is introduced I provide two ribs 13 and 14 in front of the trimming tools. These ribs have beveled, non-serrated faces. By pressing on the rib 14, the line 18, ejected from the mold, presses the movable trimming tool so far backward that the line can slide past the tool. In order still more to facilitate this rearward motion of the tool 4, as represented in the drawings the slide 5 may be arranged at an angle of 45° to the direction of motion of the line 18. The stationary trimming tool 3 is located so far to the rear that the line 18 still half in the mold is, only just or not quite contacted by its cutting edge. As soon as the line 18 has entirely left the mold 15, however, it is pressed by the movable trimming tool 4 against the stationary one, 3, and when driven farther by the ejecting plate 17 is trimmed on both sides.

In consequence of the slanting position of the slide relatively to the direction of motion of the ejector 17, when the latter returns jamming would occur if the teeth of the trimming tool 4 contacted with the ejector. In order to prevent this the slide 5 is provided at its rear end with a screw 19 extending through a hole in the holder 2. On this screw are two nuts, 20 and 21, of which the former is so placed that it strikes against the holder 2 before the teeth of the trimming tool 4 contact with the ejector. The second nut 21 serves for locking the nut 20. The ejector must be so much thinner than the thinnest line so that the latter can be certainly trimmed without the ejector simultaneously contacting with the trimming tool. Also, when a plurality of molds for bodies of lines of various thicknesses are alternately employed in one machine, the ejector must always be somewhat thinner than the thinnest line-body.

As compared with known arrangements for the same purpose, my above described trimming device has a considerably greater total length of cutting edges, and consequently these edges are subjected to less wear. Further, the trimming device automatically adapts itself so that, when the mold is changed, no adjustment of the device is necessary if a thicker ejecting plate is not simultaneously taken into use.

I claim:—

1. In line-trimming apparatus for matrix-setting and line-casting machines, the combination, with the frame, of a plate secured thereon, a holder mounted on the frame, a slide readily movable on the holder, a plate parallel with the former plate secured to the slide, said plates having file-like teeth on their adjacent faces, means pressing the slide toward the former plate, and means preventing the plates contacting one with the other, said holder being located at an acute angle relatively to the adjacent faces of the plates.

2. In line-trimming apparatus for matrix-setting and line-casting machines, the combination, with the frame, of a plate secured thereon, a holder mounted on the frame, a slide readily movable on the holder, a plate parallel with the former plate secured to the slide, said plates having file-like teeth on their adjacent faces, means pressing the slide toward the former plate, and adjustable means mounted on the slide and adapted to coact with the holder for preventing the plates contacting one with the other, said holder being located at an acute angle relatively to the adjacent faces of the plates.

3. In line-trimming apparatus for matrix-setting and line-casting machines, the combination, with the frame, of a plate secured thereon, a holder mounted on the frame, a slide readily movable in the holder, a plate parallel with the former plate secured to the slide, said plates having file-like teeth on their adjacent faces, means pressing the slide toward the former plate, a beveled, non-serrated rib attached at the front edge of each plate for receiving the body of a line before the same arrives at the serrated parts of the plates, whereby the plates are adjusted to the required distance apart, and means preventing the plates contacting one with the other.

In testimony whereof I have signed my name to this specification in the presence of two subscribing witnesses.

HEINRICH DREWELL.

Witnesses:
HENRY HASPER,
WOLDEMAR HAUPT.

---

Copies of this patent may be obtained for five cents each, by addressing the "Commissioner of Patents, Washington, D. C."